US011028722B2

(12) United States Patent
Freeman et al.

(10) Patent No.: US 11,028,722 B2
(45) Date of Patent: Jun. 8, 2021

(54) CERAMIC MATRIX COMPOSITE BLADE TRACK ASSEMBLY WITH TIP CLEARANCE CONTROL

(71) Applicants: Rolls-Royce North American Technologies Inc., Indianapolis, IN (US); Rolls-Royce Corporation, Indianapolis, IN (US)

(72) Inventors: Ted J. Freeman, Danville, IN (US); Aaron D. Sippel, Zionsville, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 543 days.

(21) Appl. No.: 15/992,983

(22) Filed: May 30, 2018

(65) Prior Publication Data

US 2019/0368367 A1    Dec. 5, 2019

(51) Int. Cl.
*F01D 11/24* (2006.01)
*F01D 25/12* (2006.01)

(52) U.S. Cl.
CPC .............. *F01D 11/24* (2013.01); *F01D 25/12* (2013.01); *F05D 2240/11* (2013.01); *F05D 2300/6033* (2013.01)

(58) Field of Classification Search
CPC .......... F01D 11/00; F01D 11/08; F01D 11/14; F01D 11/20; F01D 11/22; F01D 11/24; F01D 25/12; F01D 25/24; F01D 25/246; F01D 25/28; F01D 9/04; F01D 9/06; F05D 2240/11; F05D 2300/6033

USPC ....................................................... 415/173.2
See application file for complete search history.

(56) References Cited

U.S. PATENT DOCUMENTS

| | | | |
|---|---|---|---|
| 5,167,488 A | 12/1992 | Ciokajlo et al. | |
| 5,320,486 A | 6/1994 | Walker et al. | |
| 7,445,425 B2 | 11/2008 | Ferra et al. | |
| 7,562,880 B2 | 7/2009 | Paprotna et al. | |
| 7,922,444 B2 | 4/2011 | Propheter-Hinckley | |
| 8,206,085 B2 | 6/2012 | Ammann | |
| 8,240,985 B2 | 8/2012 | Martin | |
| 8,256,228 B2 | 9/2012 | O'Leary | |
| 8,322,977 B2 | 12/2012 | Beeck | |
| 8,585,354 B1 | 11/2013 | Liang | |
| 8,616,827 B2 | 12/2013 | O'Leary | |
| 8,784,041 B2 | 7/2014 | Durocher et al. | |
| 8,905,708 B2 | 12/2014 | Weber et al. | |
| 9,399,926 B2 | 7/2016 | Wiebe | |
| 9,447,696 B2 | 9/2016 | McCaffrey et al. | |
| 9,587,517 B2 | 3/2017 | Vetters et al. | |
| 9,598,975 B2 | 3/2017 | Uskert et al. | |
| 9,926,801 B2 | 3/2018 | Uskert et al. | |
| 10,519,790 B2 * | 12/2019 | Hafner | F01D 11/08 |
| 2011/0229306 A1 * | 9/2011 | Lewis | F01D 11/24 415/115 |
| 2013/0022459 A1 | 1/2013 | Samudrala et al. | |

(Continued)

*Primary Examiner* — Woody A Lee, Jr.
*Assistant Examiner* — Justin A Pruitt
(74) *Attorney, Agent, or Firm* — Barnes & Thornburg LLP

(57) ABSTRACT

The present disclosure is directed to a blade track assembly used in a gas turbine engine. The blade track assembly includes blade track segments made from ceramic matrix composite materials and a tip clearance control system for adjusting the inner diameter of the blade track assembly during use in an engine.

20 Claims, 3 Drawing Sheets

(56) References Cited

U.S. PATENT DOCUMENTS

| | | |
|---|---|---|
| 2015/0354412 A1* | 12/2015 | Preston .................. F01D 25/28 60/796 |
| 2015/0377035 A1 | 12/2015 | Freeman et al. |
| 2016/0102572 A1* | 4/2016 | O'Leary ................. F01D 11/12 415/173.1 |
| 2016/0177769 A1 | 6/2016 | Iwrey |
| 2016/0319688 A1 | 11/2016 | Vetters et al. |
| 2017/0138597 A1 | 5/2017 | Freeman et al. |
| 2017/0350268 A1 | 12/2017 | McCaffrey |
| 2018/0010475 A1 | 1/2018 | Uskert et al. |

* cited by examiner

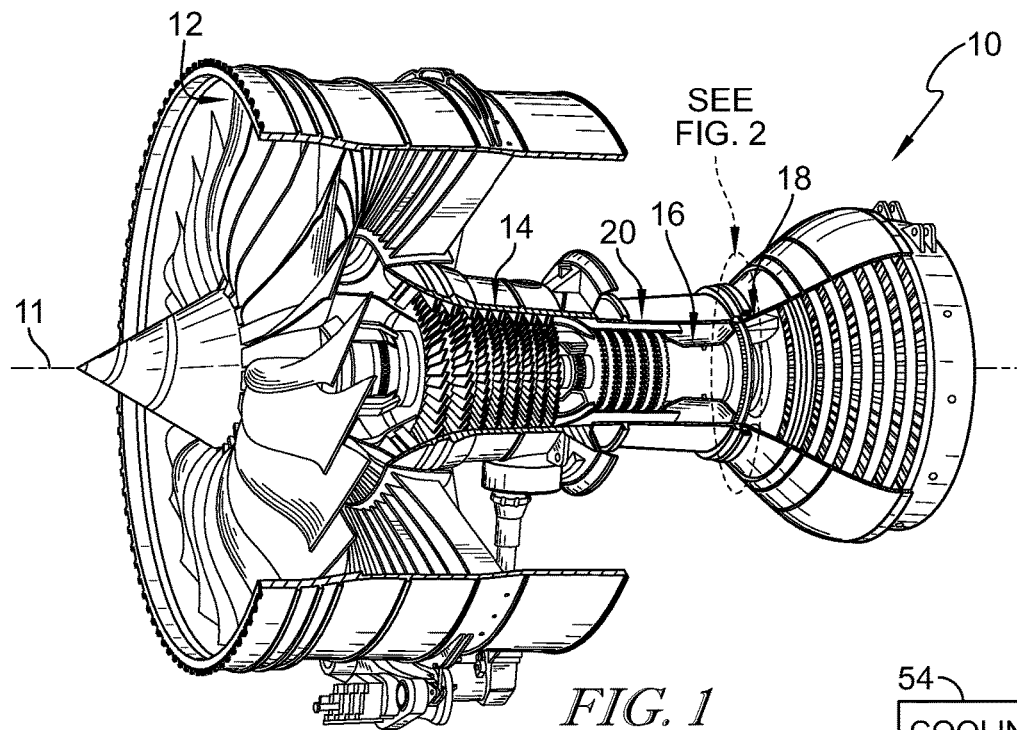
FIG. 1
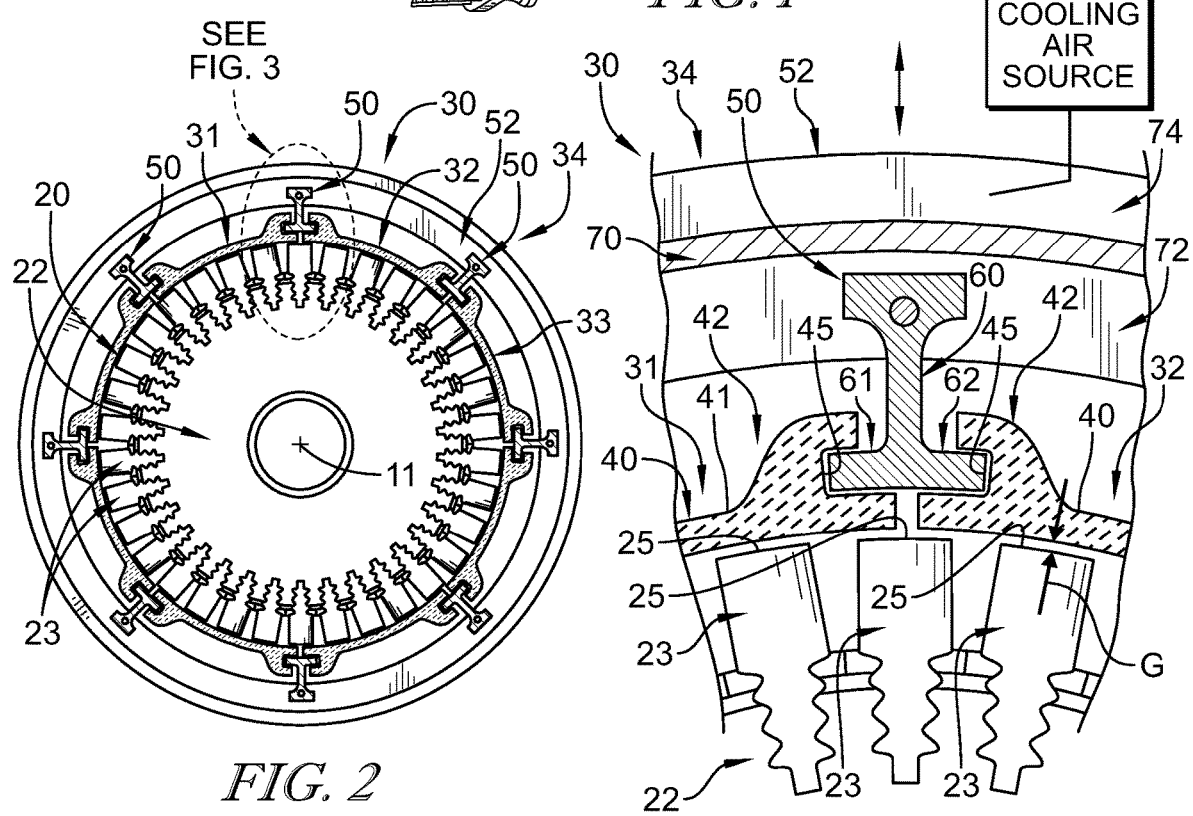
FIG. 2
FIG. 3

CERAMIC MATRIX COMPOSITE BLADE TRACK ASSEMBLY WITH TIP CLEARANCE CONTROL

FIELD OF THE DISCLOSURE

The present disclosure relates generally to gas turbine engines, and more specifically to ceramic matrix composite components incorporated into assemblies used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade track assemblies arranged around the rotating wheel assemblies so as to block hot gasses from moving over the blades without interacting with the blades.

Some blade track assemblies positioned in the turbine may be exposed to high temperatures from products of the combustion reaction in the combustor. Such blade track assemblies sometimes include components made from ceramic matrix composite materials designed to withstand high temperatures.

SUMMARY

The present disclosure may comprise one or more of the following features and combinations thereof.

A blade track assembly adapted for use around a turbine wheel in a gas turbine engine is disclosed. The assembly may include a plurality of blade track segments made from ceramic matrix composite materials and a tip clearance control system configured to move the plurality of blade track segments radially inward and outward relative to the central axis. The plurality of blade track segments may include a first segment and a second segment each shaped to include a runner that extends partway around a central axis to define a primary gas path and a hanger-receiving slot arranged to open facing circumferentially around the central axis. The tip clearance control system may include a metallic case that extends around the central axis radially outward of the plurality of blade track segments and a hanger coupled to the metallic case that extends to the plurality of blade track segments.

In illustrative embodiments, the hanger is slidably received within the hanger-receiving slot of the first segment and is slidably received within the hanger-receiving slot of the second segment. Accordingly, the first segment and the second segment may be mounted for movement circumferentially toward and away from one another in response to radially outward and inward movement of the metallic case.

In illustrative embodiments, the first segment and the second segment may be each shaped to include a hanger receiver that extends radially outward from the runner at a circumferential end of the runner and that defines at least a portion of the hanger-receiving slot. The runner of the first segment may have a substantially constant radial thickness and may have a radially-outwardly facing surface that defines a side of the hanger-receiving slot.

In illustrative embodiments, the hanger-receiving slot is lined with lined with Chromium Carbide/Nickel Chromium alloys or Cobalt based alloys that provide a coating. The coating may be configured to facilitate sliding engagement with the hanger.

In illustrative embodiments, the tip clearance control system may include a cooling air source configured to discharge pressurized air on the metallic case. The metallic case may extend all the way around the central axis.

In illustrative embodiments, the hanger may include a radially-extending trunk and circumferentially-extending legs that extend from the radially-extending trunk into the hanger-receiving channels. The radially-extending trunk of the hanger may be coupled to the metallic case to pivot relative to the metallic case. The hanger may comprise metallic materials or may be made from ceramic matrix composite materials/monolithic ceramic materials.

According to another aspect of the present disclosure, a blade track assembly adapted for use around a turbine wheel in a gas turbine engine may include a plurality of blade track segments made from ceramic matrix composite materials and a tip clearance control system configured to move the plurality of blade track segments radially inward and outward relative to the central axis. The plurality of blade track segments may include a first segment and a second segment each shaped to include a runner that extends partway around a central axis to define a primary gas path and a hanger-receiving slot arranged to open facing circumferentially around the central axis. The tip clearance control system may include a hanger that is slidably received within the hanger-receiving slot of the first segment and is slidably received within the hanger-receiving slot of the second segment. Accordingly, the first segment and the second segment are mounted for movement circumferentially toward and away from one another in response to radially outward and inward movement of the hanger.

In illustrative embodiments, the hanger may include legs that extend circumferentially into the hanger-receiving channels of the first segment and the second segment and a trunk that extends from the legs radially outward to a point radially outward of the plurality of blade track segments. The hanger may comprise metallic materials. The hanger may also be made from at least one of ceramic matrix composite materials or monolithic ceramic materials.

In illustrative embodiments, the first segment and the second segment may each be shaped to include a hanger receiver that extends radially outward from the runner at a circumferential end of the runner and that defines at least a portion of the hanger-receiving slot. The runner of the first segment may have a substantially constant radial thickness and may have a radially-outwardly facing surface that defines a side of the hanger-receiving slot.

In illustrative embodiments, the hanger-receiving slot is lined with Chromium Carbide/Nickel Chromium alloys or Cobalt based alloys that provide a coating. The coating may be configured to facilitate sliding engagement with the hanger.

According to yet another aspect of the present disclosure, a gas turbine engine may include a compressor and a turbine.

The compressor may be configured to receive and compress air for discharge at a pressure greater than when received. The turbine may include a turbine wheel having blades mounted for rotation about a central axis and a blade track assembly that extends around the blades to block hot gasses from moving over the blades without interacting with the blades.

In illustrative embodiments, the blade track assembly may include a plurality of blade track segments made from ceramic matrix composite materials that define a primary gas path around the turbine wheel. The blade track assembly may further include a tip clearance control system configured to move the plurality of blade track segments radially inward and outward to control a gap defined between the blades and the plurality of blade track segments during operation of the gas turbine engine.

In illustrative embodiments, the plurality of blade track segments may include (i) a first segment shaped to include a runner that extends partway around the central axis and a hanger-receiving slot arranged to open facing circumferentially around the central axis and (ii) a second segment shaped to include a runner that extends partway around the central axis and a hanger-receiving slot arranged to open facing the hanger-receiving slot of the first segment. The tip clearance control system may also include a metallic case that extends around the central axis radially outward of the plurality of blade track segments and a hanger coupled to the metallic case that extends radially inward to the plurality of blade track segments and into the hanger receiving slots of the first segment and the second segment.

The hanger may be slidably received within the hanger-receiving slot of the first segment and is slidably received within the hanger-receiving slot of the second segment. The compressor may provide a cooling air source included in the tip clearance control system. The tip clearance control system may further include a computer controlled valve that manages a flow of cooling air discharged onto the metallic case from the cooling air source These and other features of the present disclosure will become more apparent from the following description of the illustrative embodiments.

BRIEF DESCRIPTION OF THE DRAWINGS

FIG. 1 is a cut-away perspective view of a gas turbine engine showing that the engine includes (from left to right, a fan, a compressor, a combustor, and a turbine;

FIG. 2 is an axially-looking sectional view of a blade track included in the turbine of the gas turbine engine of FIG. 1 showing that the blade track has a plurality of ceramic matrix composite blade track segments mounted around blades of a turbine wheel, FIG. 3 is a detail view of a portion of FIG. 2 showing that the ceramic matrix composite blade track segments are mounted to a tip clearance control system configured to move the ceramic matrix composite blade track segments inward and outward from a central axis and a gap around the blades of the turbine wheel, and showing that the tip clearance control system includes a metallic case, hangers that extend from the case to the ceramic matrix blade track segments, and a cooling air source;

DETAILED DESCRIPTION OF THE DRAWINGS

Figure 4:
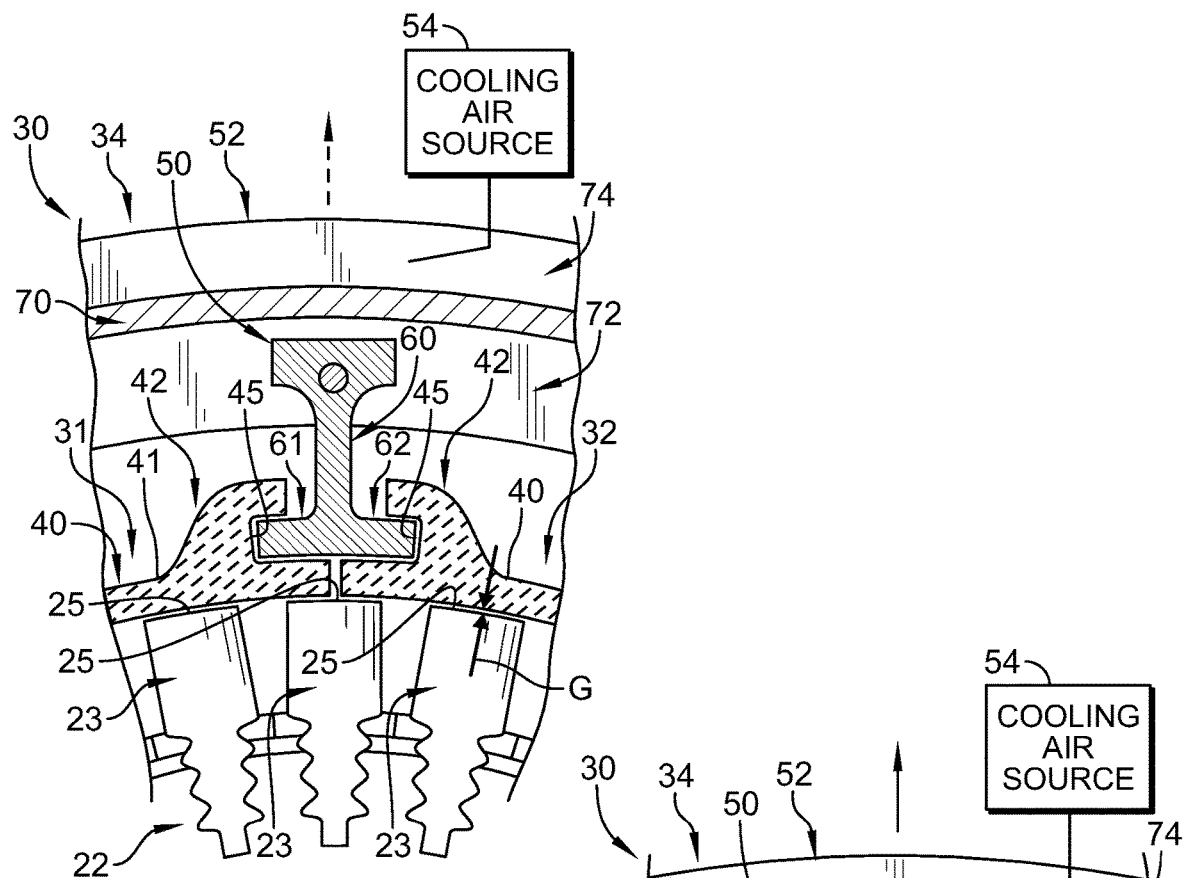
FIG. 4 is a detail view similar to FIG. 3 showing the gap around the blades of the turbine wheel as the turbine wheel heats up and expands so as to reduce the size of the gap before the tip clearance control system is activated by the reduction of cooling air to expand the gap as shown in FIG. 5.
Figure 5:
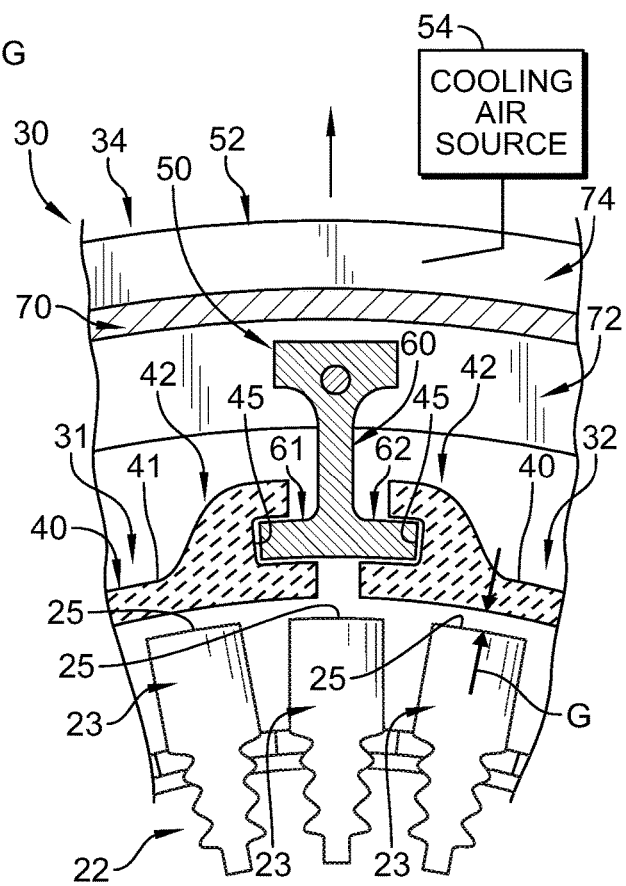
FIG. 5 is a detail view similar to FIGS. 3 and 4 showing the tip clearance control system included in the blade track activated by the reduction of cooling air supplied causing the metallic case to expand and pull the ceramic matrix composite blade track segments outward, away from the turbine blades.

For the purposes of promoting an understanding of the principles of the disclosure, reference will now be made to a number of illustrative embodiments illustrated in the drawings and specific language will be used to describe the same.

An illustrative gas turbine engine 10 in FIG. 1 is cut away to show that the engine 10 includes a fan 12, a compressor 14, a combustor 16, and a turbine 18. The fan 12 is driven by the turbine 18 to provide thrust. The compressor 14 receives and compresses air for delivery to the combustor 16. The combustor 16 mixes fuel with the compressed air from the compressor 14 and ignites the fuel to produce hot, high-pressure gas. The hot, high-pressure gas from burning fuel in the combustor 16 is directed into the turbine 18, and the turbine 18 extracts work to drive the compressor 14 and the fan 12.

The turbine 18 includes a wheel assembly 20 surrounded by a blade track assembly 30 as shown in FIG. 2. The wheel assembly 20 includes a disk 22 and peripheral blades 24 all mounted for rotation about a central axis 11. The blade track assembly 30 extends around radially-outer tips 25 of the blades 24 to block hot gasses from moving over the blades 24 without interacting with the blades 24.

In the illustrative embodiment, the blade track assembly 30 includes a tip clearance control system 34 as shown in FIG. 3. The tip clearance control system 34 provides means for changing the inner diameter of the blade track assembly so that a gap G between the radially-outer tips 25 of the blades 24 can be controlled during operation of the engine 10. By controlling the size of the gap G, the amount of gas that leaks over the radially-outer tips 25 of the blades 24 can be managed for efficiency while also avoiding unplanned rub of the blades 24 into the blade track assembly 30 that can impact life of the components.

The blade track assembly 30 of the exemplary embodiment includes a plurality of blade track segments 31, 32, 33 and the tip clearance control system 34 as shown in FIGS. 2 and 3. The blade track segments 31, 32, 33 each extend part way around the central axis 11 to define an outer boundary of a primary gas path where the turbine blades 24 are located. The tip clearance control system 34 is configured to move the blade track segments 31, 32, 33 inwardly and outwardly in the radial direction relative to the central axis 11 to change the diameter of the outer boundary of the primary gas path.

Each of the blade track segments 31, 32, 33 is substantially similar and is made from ceramic matrix composite materials designed to withstand high temperatures. Each of the blade track segments 31, 32, 33 is shaped to include a runner 40 and hanger receivers 42 at each circumferential end of the runner 40 as suggested in FIG. 3. The runner 40 extends partway around the central axis 11 to define the primary gas path. The hanger receivers 42 support coupling of the blade track segments 31, 32, 33 to the tip clearance control system 34.

The runner 40 of each blade track segment 31, 32, 33 illustratively has a constant thickness and defines an inner diameter of the blade track assembly 30 as suggested in FIGS. 2 and 3. The runner 40 of each blade track segment 31, 32, 33 is circumferentially spaced apart from adjacent blade track segments 31, 32, 33 to avoid binding of the blade track assembly 30 upon reconfiguration to control the gap G.

Designs in accordance with the present disclosure include runners 40 that are sized to maintain a gap between circumferentially adjacent blade track segments 31, 32, 33 at all engine operating conditions. These gaps allow for radial motion inwardly and outwardly while avoiding binding or damage to the blade track segments 31, 32, 33.

The hanger receivers 42 of each blade track segment 31, 32, 33 extend radially outward from a corresponding runner 40 outside the primary gas path as suggested in FIGS. 2 and 3. The hanger receivers 42 have a L-shaped cross-sectional shape with a radially-extending portion and a circumferentially-extending portion as shown in FIG. 3.

Hanger-receiving slots 45 that open to face in the circumferential direction toward aligned, adjacent hanger-receiving slots 45 slidably receive a hanger 50 included in the tip clearance control system 34 as shown in FIG. 3. The hanger-receiving slots 45 are defined by the hanger receivers 42 and by a radially-outwardly facing surface 41 of the runner 40. The hanger-receiving slots 45 are lined with Chromium Carbide/Nickel Chromium alloys or Cobalt based alloys that provide a coating that facilitates sliding engagement with the hanger 50. These coating are characterized by providing a lower coefficient of friction than an untreated hanger-receiving slot 45 formed in ceramic matrix composite materials so that sliding engagement within the slots is encouraged.

The tip clearance control system 34 is configured to move the blade track segments 31, 32, 33 radially inward and outward to change the inner diameter of the blade track assembly 30 as suggested in FIGS. 4-7. The tip clearance control system 34 includes hangers 50, an annular metallic case 52, and a cooling air source 54. The hangers 50 extend from the metallic case 52 to the blade track segments 31, 32, 33 to couple the segments 31, 32, 33 to the case 52. The metallic case 52 is made from materials with a preselected coefficient of thermal expansion so that the case 52 expands and contracts based on temperature. The cooling air source 54 is used to apply cooling air to the case 52 to manage the temperature of the case 52, thereby changing its size, specifically, diameter.

The hangers 50 are illustratively of metallic construction but, in some embodiments, may be made from ceramic matrix composites or ceramic monolithic materials. The hangers 50 each include a trunk 60 that extends radially inward from the metallic case 52 and a pair of legs 61, 62 that each extend circumferentially from the trunk 60 to form a T-shape cross-section as shown in FIG. 3. The trunk 60 is pivotably coupled to the case 52 in the illustrative embodiment but may be fixed to the case 52 in other designs. The pair of legs 61, 62 extend into the hanger-receiving slots 45 of adjacent blade track segments 31, 32. The legs 61, 62 may also have friction lowering coating applied to encourage sliding engagement with the blade track segments 31, 32.

Figure 6:
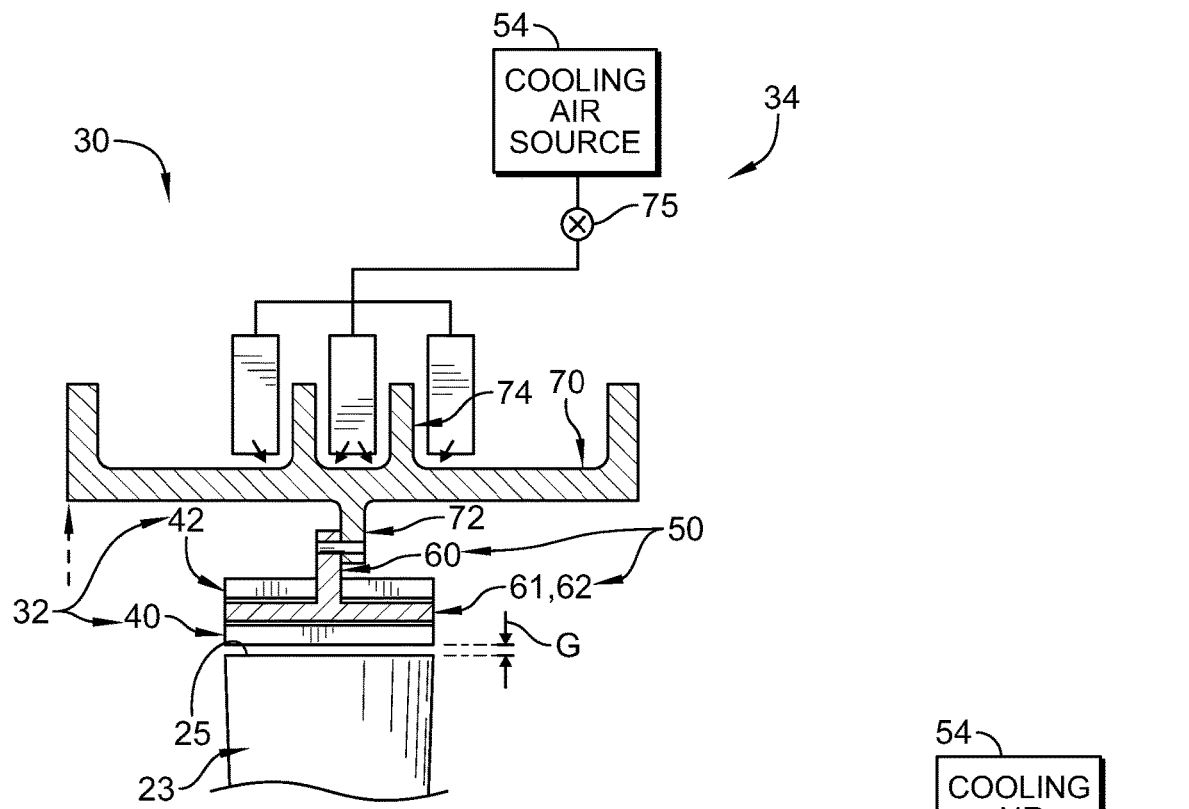
FIG. 6 is a circumferentially-looking sectional view of the blade track of FIG. 4 showing features of the metallic case that are temperature controlled to manage diameter of the metallic case.
Figure 7:
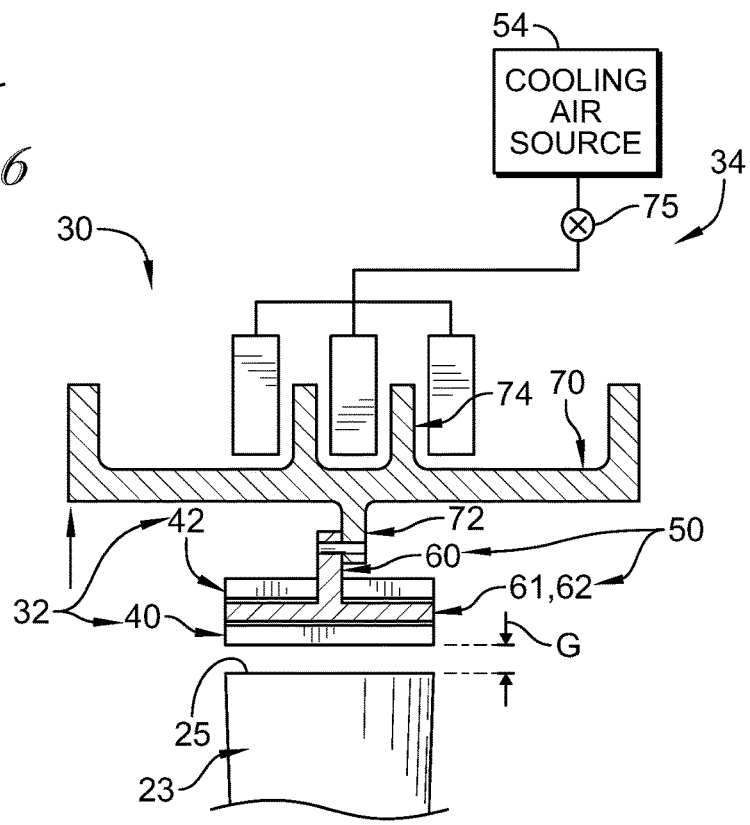
FIG. 7 is a circumferentially-looking sectional view of the blade track of FIG. 5 showing the tip clearance control system included in the blade track activated by the reduction of cooling air supplied.

The metallic case 52 is illustratively made from a one-piece annular component but, in other embodiments, may be a multi-piece assembly joined together to form a full ring. The case 52 includes a main ring 70, an inner flange 72 to which the hangers 50 are coupled, and outwardly extending heat sink flanges 74 as shown in FIGS. 6 and 7. The inner flange 72 extends radially inwardly from the main ring 70 and provides an axially-facing mount point for the hangers 50. The heat sink flanges extend outwardly from the main ring 70 in locations axially forward and aft of the inner flange 72. Cooling air from the cooling air source 54 is metered out onto the heat sink flanges 74 to drive controlled expansion and contraction of the inner flange 72 so that the hangers 50 are moved radially outwardly and inwardly.

The cooling air source 54 is illustratively provided by the compressor 14 and is metered by a computer controlled valve 75 as shown in FIGS. 6 and 7. The valve 75 that manages a flow of cooling air discharged onto the metallic case 52 from the cooling air source 54. In illustrative examples, the valve 75 may be opened or closed based on input from temperature sensors, speed sensors, throttle position sensors, and the like.

Designs in accordance with the present disclosure can utilize !-beam or T-section hangers 50 to connect blade track segments 31, 32, 33 with the case 52 or an intermediate carrier in order to facilitate tip clearance control. The blade track segments 31, 32, 33 (sometimes called seal segments) would be assembled into a full hoop with the hangers 50 (sometimes called I-beam or T-section connectors) installed. The full hoop would then be inserted into the turbine case 52 with the I-beam or T-section 50 attached directly to the case 52 or to an intermediate carrier which would be attached to the case 52. Air could then be blown onto the case 52 to either heat or cool it (as required) to minimize the gap G between the seal segment and case. The system could also be used to open up the tip clearance during transient conditions to minimize blade rub into the seal segment 31, 32, 33.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A blade track assembly adapted for use around a turbine wheel in a gas turbine engine, the assembly comprising a plurality of blade track segments made from ceramic matrix composite materials, the plurality of blade track segments including a first segment and a second segment spaced apart circumferentially from the first segment and each shaped to include a runner that extends partway around a central axis to define a primary gas path and a hanger-receiving slot arranged to open facing circumferentially around the central axis, and a tip clearance control system configured to move the plurality of blade track segments radially inward and outward relative to the central axis, the tip clearance control system including a metallic case that extends around the central axis radially outward of the plurality of blade track segments and a hanger coupled to the metallic case that extends to the plurality of blade track segments, wherein the hanger is slidably received within the hanger-receiving slot of the first segment and is slidably received within the hanger-receiving slot of the second segment so that the first segment and the second segment are mounted for movement circumferentially toward and away from one another in response to radially outward and inward movement of the metallic case, wherein the hanger includes a radially-extending trunk that extends radially between a first end and a second end, a first circumferentially-extending leg that extends from the second end of the radially-extending trunk into the hanger-receiving channel of the first segment, and a second circumferentially-extending leg that extends from the second end of the radially-extending trunk opposite the first circumferentially-extending leg into the hanger-receiving channel of the second segment, and wherein the radially-extending trunk is pivotably coupled with the metallic case at the first end of the radially-extending trunk.

2. The assembly of claim 1, wherein the first segment and the second segment are each shaped to include a hanger receiver that extends radially outward from the runner at a circumferential end of the runner and that defines at least a portion of the hanger-receiving slot.

3. The assembly of claim 2, wherein the runner of the first segment has a substantially constant radial thickness and has a radially-outwardly facing surface that defines a side of the hanger-receiving slot.

4. The assembly of claim 1, wherein the hanger-receiving slot is lined with lined with Chromium Carbide or Nickel Chromium alloys or Cobalt based alloys that provide a coating configured to facilitate sliding engagement with the hanger.

5. The assembly of claim 1, wherein the tip clearance control system includes a cooling air source configured to discharge pressurized air on the metallic case.

6. The assembly of claim 5, wherein the metallic case extends all the way around the central axis to form a single piece annular component distinct from the hanger.

7. The assembly of claim 1, wherein the hanger is made from at least one of ceramic matrix composite materials or monolithic ceramic materials.

8. The assembly of claim 1, wherein the radially-extending trunk, the first circumferentially-extending leg, and a second circumferentially-extending leg are integrally formed and move together as a discrete component.

9. A blade track assembly adapted for use around a turbine wheel in a gas turbine engine, the assembly comprising a plurality of blade track segments made from ceramic matrix composite materials, the plurality of blade track segments including a first segment and a second segment each shaped to include a runner that extends partway around a central axis to define a primary gas path and a hanger-receiving slot arranged to open facing circumferentially around the central axis, and a tip clearance control system configured to move the plurality of blade track segments radially inward and outward relative to the central axis, the tip clearance control system including a first hanger that is slidably received within the hanger-receiving slot of the first segment and is slidably received within the hanger-receiving slot of the second segment so that the first segment and the second segment are mounted for movement circumferentially toward and away from one another in response to radially outward and inward movement of the hanger, wherein the first hanger includes a radially-extending trunk that extends radially between a first terminal end and a second terminal end, a first leg that extends circumferentially from the second end of the radially-extending trunk into the hanger-receiving slot of the first segment, and a second leg that extends circumferentially from the second end of the radially-extending trunk opposite the first leg into the hanger-receiving slot of the second segment, and the radially-extending trunk, the first leg, and the second leg are fixed together for movement as a unit, wherein the tip clearance control system includes a second hanger discrete from and spaced apart circumferentially from the first hanger and is slidably received within the hanger-receiving slot of the second segment.

10. The assembly of claim 9, wherein the first hanger comprises metallic materials.

11. The assembly of claim 9, wherein the first hanger is made from at least one of ceramic matrix composite materials or monolithic ceramic materials.

12. The assembly of claim 9, wherein the first segment and the second segment are each shaped to include a hanger receiver that extends radially outward from the runner at a circumferential end of the runner and that defines at least a portion of the hanger-receiving slot.

13. The assembly of claim 12, wherein the runner of the first segment has a substantially constant radial thickness and has a radially-outwardly facing surface that defines a side of the hanger-receiving slot.

14. The assembly of claim 9, wherein the hanger-receiving slot is lined with Carbide or Nickel Chromium alloys or Cobalt based alloys that provide a coating configured to facilitate sliding engagement with the first hanger.

15. The assembly of claim 9, wherein the radially-extending trunk, the first leg, and the second leg are integrally formed as a single-piece component and have a T-shaped cross-section when viewed axially so that movement of the first hanger causes the first and second segments to move together radially.

16. The assembly of claim 9, further comprising a full-annular case and the hanger is pivotably mounted to the full-annular case at the first terminal end of the radially-extending trunk such that the radially-extending trunk, the first leg, and the second leg pivot together relative to the full-annular case.

17. A gas turbine engine comprising a compressor configured to receive and compress air for discharge at a pressure greater than when received, and a turbine including a turbine wheel having blades mounted for rotation about a central axis and a blade track assembly that extends around the blades to block hot gasses from moving over the blades without interacting with the blades, the blade track assembly including a plurality of blade track segments made from ceramic matrix composite materials that define a primary gas path around the turbine wheel and a tip clearance control system configured to move the plurality of blade track segments radially inward and outward to control a gap defined between the blades and the plurality of blade track segments during operation of the gas turbine engine, wherein the plurality of blade track segments includes (i) a first segment shaped to include a runner that extends partway around the central axis and a hanger-receiving slot arranged to open facing circumferentially around the central axis and (ii) a second segment shaped to include a runner that extends partway around the central axis and a hanger-receiving slot arranged to open facing the hanger-receiving slot of the first segment, and wherein the tip clearance control system includes a metallic case that extends around the central axis radially outward of the plurality of blade track segments and a hanger coupled to the metallic case that extends radially inward to the plurality of blade track segments and into the hanger receiving slots of the first segment and the second segment, wherein the hanger includes a radially-extending trunk that extends radially between a first end and a second end, a first leg that extends circumferentially from the second end of the radially-extending trunk, and a second leg that extends circumferentially from the second end of the radially-extending trunk opposite the first leg, and the hanger is pivotably mounted to the metallic case at the first end of the radially-extending trunk such that the radially-extending trunk, the first leg, and the second leg pivot together.

18. The gas turbine engine of claim 17, wherein the hanger is slidably received within the hanger-receiving slot of the first segment and is slidably received within the hanger-receiving slot of the second segment.

19. The gas turbine engine of claim 17, wherein the compressor provides a cooling air source included in the tip clearance control system and the tip clearance control system further includes a computer controlled valve that manages a flow of cooling air discharged onto the metallic case from the cooling air source.

20. The gas turbine engine of claim 17, wherein the radially-extending trunk, the first leg, and the second leg are integrally formed together as a discrete component.

* * * * *